(12) United States Patent
Wolfrum

(10) Patent No.: US 10,074,986 B2
(45) Date of Patent: Sep. 11, 2018

(54) SYSTEM FOR PROVIDING A PRIMARY CONTROL POWER FOR A POWER GRID

(71) Applicant: Caterva GmbH, Pullach (DE)

(72) Inventor: Philipp Wolfrum, Munich (DE)

(73) Assignee: Caterva GmbH, Pullach (DE)

( * ) Notice: Subject to any disclaimer, the term of this patent is extended or adjusted under 35 U.S.C. 154(b) by 152 days.

(21) Appl. No.: 14/890,151

(22) PCT Filed: May 23, 2013

(86) PCT No.: PCT/EP2013/060570
§ 371 (c)(1),
(2) Date: Nov. 9, 2015

(87) PCT Pub. No.: WO2014/187487
PCT Pub. Date: Nov. 27, 2014

(65) Prior Publication Data
US 2016/0134117 A1   May 12, 2016

(51) Int. Cl.
H02J 3/32 (2006.01)
H02J 7/04 (2006.01)
H02M 7/04 (2006.01)
H02J 3/14 (2006.01)

(52) U.S. Cl.
CPC ............ H02J 3/32 (2013.01); H02J 7/042 (2013.01); H02M 7/04 (2013.01); H02J 2003/146 (2013.01)

(58) Field of Classification Search
CPC ............ H02J 3/32; H02J 7/042; H02M 7/04
See application file for complete search history.

(56) References Cited

U.S. PATENT DOCUMENTS

| 9,667,071 B2 * | 5/2017 | Markowz ............... H02J 7/00 |
| 2010/0090532 A1 | 4/2010 | Taku |
| 2013/0090900 A1 * | 4/2013 | Gering ............... G01R 31/3679 703/2 |
| 2014/0184136 A1 * | 7/2014 | Ture ............... H02J 7/0052 320/101 |

FOREIGN PATENT DOCUMENTS

| DE | 10 2011/055229 | 5/2013 |
| DE | 10 2011/055231 | 5/2013 |
| DE | 10 2011/055252 | 5/2013 |
| EP | 2139090 | 12/2009 |
| WO | WO 2007/104167 | 9/2007 |

* cited by examiner

Primary Examiner — Jared Fureman
Assistant Examiner — Aqeel Bukhari
(74) Attorney, Agent, or Firm — Farjami & Farjami LLP

(57) ABSTRACT

A system for providing a primary control power (PCP) for a power grid (PG) by at least one energy storage device (ESD) comprising an energy resource controller (ERC) connected to said energy storage device (ESD), wherein said energy resource controller (ERC) has a state of charge control unit (SOC-CU) adapted to perform a state of charge (SOC) power control of the energy storage device (ESD) to avoid inadmissible state of charge states of the energy storage device (ESD) caused by a stochastic demand for primary control power (PCP) by said power grid (PG).

17 Claims, 4 Drawing Sheets

SYSTEM FOR PROVIDING A PRIMARY CONTROL POWER FOR A POWER GRID

This is a U.S. national phase application, which is based on, and claims priority from, PCT application Serial No. PCT/EP2013/060570, filed May 23, 2013.

The invention relates to a system and method for providing a primary control power in a power grid by at least one energy storage device, in particular by means of a battery.

A power grid or power supply grid is an electrical grid formed by an interconnected network for delivering electrical power from suppliers to consumers. A power grid comprises generating units that produce electrical power, transmission lines that carry power from distant sources to consumers and distribution lines to connect individual customers to the power grid. In a power grid, the permanent balance between generation and consumption of electricity is an important requirement for stable and reliable system operation. To provide a sufficiently reliable electricity supply, control power reserves have to be provided. The demand for a control power arises because the sum of actual generation of power differs from the current load or consumption. The difference can arise from the load side, for instance meteorological influences, as well as from the generation side, for instance shut-down power plants. To maintain an energy balance between generation and consumption in a transmission grid, a reserve power is required due to the changing loads and varying generation of power. Different types of control power can be distinguished. Transmission system operators TSO are required to maintain a permanent balance between power generation and demand in their respective control area and to provide a balancing energy to the groups comprising electrical producers and consumers from a secondary control power and available minutes reserve. A primary control power has to be provided by all transmission system operators TSO within a time frame of a few seconds. Primary control power is provided by all synchronously connected transmission system operators inside an area. Whereas the secondary control power is to be activated within a few minutes, the primary control power must be available within a time frame of e.g. 30 seconds. The primary control power of a transmission system operator is provided to automatically stabilize a system frequency of the power grid.

In a conventional power grid, the primary control power is mainly provided by power plants which operate in an intermediate operation level and can be ramped up or down within a few seconds to provide (positive or negative) primary control power for stabilization of the power grid.

However, the provision of primary control power by generators or power plants ramped up or down from an intermediate operation mode is not efficient since generators or power plants have to be kept in operation at all times even if no primary control power for stabilization of the power grid is required.

Accordingly, there is a need for a method and system for providing a primary control power for a power grid that operates more efficiently.

This objective is achieved by a system for providing a primary control power for a power grid comprising the features of claim 1.

According to a first aspect of the present invention, a system for providing a primary control power for a power grid by at least one energy storage device is provided comprising an energy resource controller connected to said energy storage device, wherein said energy resource controller has a state of charge control unit adapted to perform a state of charge power control of the energy storage device to avoid inadmissible state of charge states of the energy storage device caused by a stochastic demand for primary control power by said power grid.

An advantage of the system for providing a primary control power for a power grid according to the first aspect of the present invention is that inadmissible state of charge states of the energy storage device caused by a random walk effect evoked by a stochastic demand for primary control power in the power grid are avoided or suppressed. The random walk effect caused by a stochastic demand for primary control power in the power grid has until now inhibited the use of electronic or electrochemical energy storage devices such as batteries or capacitors to provide primary control power for a power grid.

Consequently, an advantage of the system according to the present invention is that electronic or electrochemical energy storage devices can be used for providing the primary control power in the power grid, in particular because such electronic or electrochemical energy storage devices fulfil the speed requirements for providing primary control power within a short time to the affected power grid.

In a possible embodiment of the system for providing a primary control power for a power grid according to the first aspect of the present invention, the energy resource controller has a primary power control unit adapted to perform a primary power control of the energy storage device depending on at least one observed or monitored grid parameter of the power grid.

In a further possible embodiment of the system for providing a primary control power for a power grid according to the first aspect of the present invention, a power conversion device connected between the power grid and the energy storage device is controlled according to power control signals calculated by the state of charge control unit and/or by said primary power control unit of said energy resource controller.

In a still further possible embodiment of the system for providing a primary control power for a power grid according to the first aspect of the present invention, the power calculated by the state of charge control unit of said energy resource controller is calculated depending on a current state of charge of the energy storage device and depending on information data indicating, an electricity price and/or a predicted demand for primary control power by said power grid.

In a still further possible embodiment of the system for providing a primary control power for a power grid according to the first aspect of the present invention, the energy resource controller is connected via a communication device to a central or distributed power grid control unit to receive the information data indicating the electricity price and/or a predicted demand for primary control power by said power grid.

In a still further possible embodiment of the system for providing a primary control power for a power grid according to the first aspect of the present invention, the grid parameters used by the primary power control unit of the energy resource controller are received from a local grid parameter measurement device and/or via the communication device.

In a still further possible embodiment of the system for providing a primary control power for a power grid according to the first aspect of the present invention, the primary power control unit is adapted to perform a droop control of the primary control power depending on an observed grid parameter of said power grid.

In a possible embodiment of the system for providing a primary control power for a power grid according to the first aspect of the present invention, the droop control is performed by said primary power control unit of the energy resource controller depending on a grid frequency of the power grid.

In a further possible embodiment of the system for providing a primary control power for a power grid according to the first aspect of the present invention, the state of charge control unit of the energy resource controller applies a step-like state of charge response curve to said conversion device.

In a further possible embodiment of the system for providing a primary control power for a power grid, the step-like state of charge response curve is applied to a conversion device comprising an AC/DC converter.

In a further possible embodiment of the system for providing a primary control power for a power grid according to the first aspect of the present invention, the step-like SOC response curve is applied by the state of charge control unit of the energy resource controller to the conversion device such that in a low SOC range the energy storage device comprises a negative power emission and is charged, in an intermediate SOC range the energy storage device comprises a neutral power emission and is neither charged nor discharged, and in a high SOC range the energy storage device comprises a positive power emission and is discharged.

In a further possible embodiment of the system for providing a primary control power for a power grid according to the first aspect of the present invention, the limits between the SOC ranges of the step-like SOC response curve are adjustable.

In a possible embodiment of the system for providing a primary control power for a power grid according to the first aspect of the present invention, the limits between the SOC ranges of the step-like SOC response curve are adjusted depending on the information data indicating an electricity price and/or a predicted demand for primary control power by said power grid.

In a still further possible embodiment of the system for providing a primary control power for a power grid according to the first aspect of the present invention, the extent of the low SOC range of the step-like SOC response curve applied by the state of charge control unit is reduced and the extent of the high SOC range of the step-like state of charge response curve applied by the state of charge control unit is expanded by the state of charge control unit, if the electricity price is increased and/or a predicted demand for primary control power by the power grid is reduced.

In a further possible embodiment of the system for providing a primary control power for a power grid according to the first aspect of the present invention, the extent of the low state of charge range of the step-like state of charge response curve applied by the state of charge control unit is expanded and the extent of the high SOC range of the step-like SOC response curve applied by the state of charge control unit is reduced by the state of charge control unit, if the electricity price is reduced and/or the predicted demand for primary control power by the power grid is increased.

According to a further aspect of the present invention, a power grid having the features of claim 14 is provided.

According to this second aspect of the present invention, a power grid comprising a plurality of energy storage devices is provided, wherein at least a portion of the energy storage devices is equipped with a system according to the first aspect of the present invention.

According to a further aspect of the present invention, a state of charge control unit is provided having the features of claim 15.

According to an embodiment of the third aspect of the present invention, the state of charge control unit is adapted to perform a state of charge control of an energy storage device depending on received information data indicating an electricity price and/or a predicted demand for primary control power by a power grid to avoid inadmissible state of charge states of the energy storage device caused by a random walk effect evoked by a stochastic demand for primary control power in the power grid.

According to a further aspect of the present invention, an energy resource controller for an energy storage device is provided comprising the features of claim 16.

According to a possible embodiment of this fourth aspect of the present invention, an energy resource controller for an energy storage device is provided, wherein said energy resource controller comprises a primary power control unit adapted to perform a primary power control of the energy storage device depending on at least one observed grid parameter of a power grid and further comprising a state of charge control unit according to the third aspect of the present invention.

According to a further aspect of the present invention, a method for providing a primary control power for a power grid comprising the features of claim 17 is provided.

According to a possible embodiment of this aspect of the present invention, a method for providing a primary control power for a power grid by at least one energy storage device is provided, wherein a state of charge control is performed at the energy storage device to avoid inadmissible state of charge states of the energy storage device caused by a stochastic demand for primary control power in said power grid.

In the following, possible embodiments of the different aspects of the present invention are described in more detail with reference to the enclosed figures.

Figure 1:
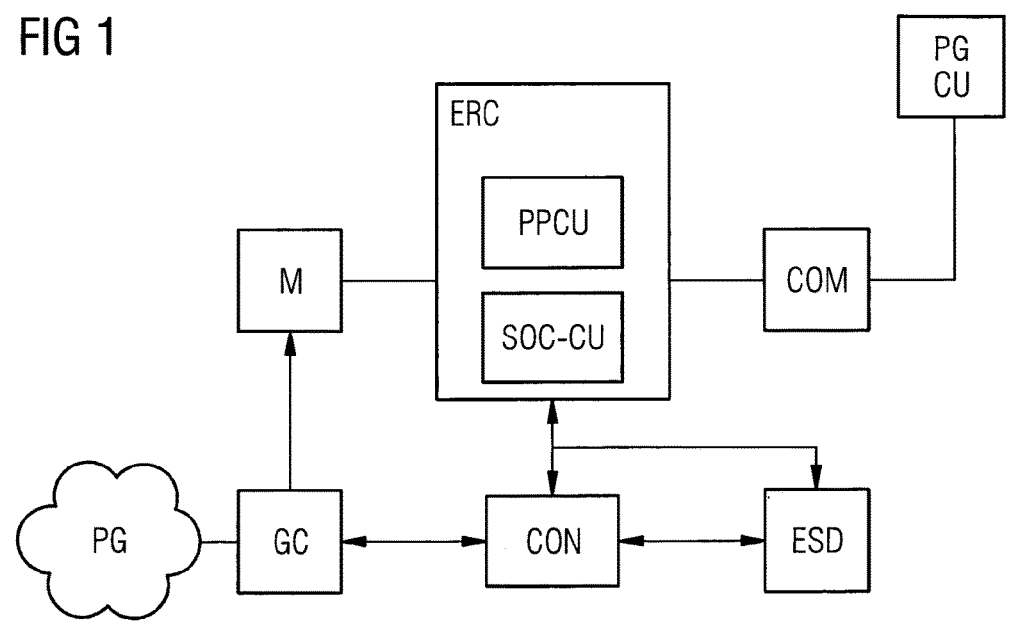
FIG. 1 shows a block diagram of a possible embodiment of a system for providing a primary control power for a power grid according to an aspect of the present invention.

As can be seen in FIG. 1, the system for providing a primary control power for a power grid according to the first aspect of the present invention comprises in the shown embodiment a grid connection GC connecting the system to a power grid PG.

The power grid PG can be a high-voltage transmission power grid adapted for transporting electrical power via transmission lines. In a possible implementation, the high-voltage power grid comprises a voltage level of more than 20 kVolts. The grid connection GC is connected to a conversion device CON, in particular an AC/DC converter. The AC/DC converter is adapted to convert an AC current used in the power grid PG and a DC current provided or supplied to the energy storage device ESD.

The energy storage device ESD can be in a possible embodiment an electrochemical energy storage device such as a battery or an accumulator. Further, the energy storage device ESD can be an electronic energy storage device storing electrical power by means of capacitors. The use of an electrochemical energy storage device or electronic storage device has the advantage that a high volume of electrical power can be provided with a high degree of efficiency. The energy storage device ESD can be combined with further energy storage means with high storage capacity such as a Redox flow battery or other storage devices storing for instance pressurized air. The energy storage device ESD can also be combined with mechanical storage devices storing mechanical energy, for instance flywheels. Moreover, the energy storage device ESD can be combined with thermal energy storage devices storing thermal energy.

The energy storage device ESD is monitored and controlled by an energy resource controller ERC as illustrated in FIG. 1. The energy resource controller ERC further controls the AC/DC converter CON as shown in FIG. 1. In the embodiment shown in FIG. 1, the system further comprises a local grid parameter measurement device M adapted to measure local grid parameters such as the grid frequency. Further monitored grid parameters can be a voltage and/or a current as well as phase differences in the power grid. Further, in the embodiment shown in FIG. 1, the energy resource controller ERC is connected via a communication device COM to a remote power grid control unit. The remote power grid control unit PGCU can be a central or a distributed power grid control unit which is connected via a communication link to the communication device COM of the system. The communication device COM can be a wireless or a wired communication device. The communication device COM can comprise a wireless transmitter or a wired data modem.

As can be seen in the embodiment in FIG. 1, the energy resource controller ERC comprises a primary power control unit PPCU and a state of charge control unit SOC-CU. The state of charge control unit SOC-CU is adapted to perform a state of charge power control of the energy storage device ESD to avoid inadmissible state of charge states of the energy storage device ESD caused by a stochastic demand for primary control power by the power grid PG.

Figure 6:
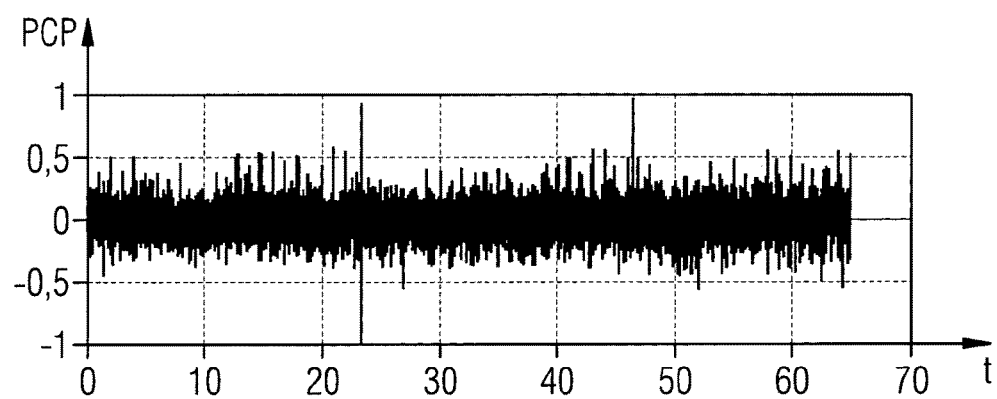
FIGS. 6, 7 show diagrams for illustrating a problem underlying the method and system according to the present invention.

As illustrated in FIG. 6, the primary control power in megawatt needed by the power grid PG varies over time stochastically. The provider of the primary control power PCP has to provide in a symmetric manner positive and negative primary control power to the power grid PG so that in total the expected power summed up over time is zero. However, because of the stochastic demand of the primary control power PCP, the actually needed primary control power PCP and also its integral over time deviates from zero significantly at different times. Accordingly, electrical power storage devices ESD with limited storage capacities cannot be used since the stochastic demand causes a so-called random walk effect so that inadmissible state of charge states are reached, if no counter-measures are applied.

Figure 7:
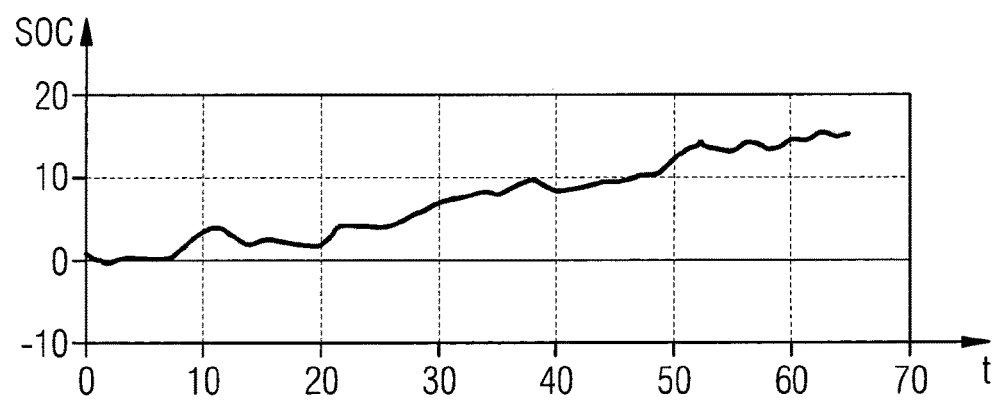

FIGS. 6, 7 show the primary control power PCP demand over a period of 65 days. FIG. 7 shows a hypothetic state of charge curve of a battery which provides this primary control power PCP. Although the primary control power PCP demand has in the long run an average of nearly zero, the hypothetic state of charge of the battery moves from an initial value of zero away to levels beyond the physical limits of the energy storage device (so-called random walk effect). The random walk is a path that consists of a succession of random steps. To overcome the random walk effect illustrated in FIG. 7, the energy resource controller ERC does not only comprise a primary power control unit PPCU adapted to perform a primary power control of the energy storage device ESD depending on at least one monitored or observed grid parameter of the power grid PG, but also a state of charge control unit SOC-CU is provided to perform a state of charge control of the energy storage device ESD to suppress such a random walk effect. Accordingly, the energy resource controller ERC comprises a primary power control unit PPCU and a state of charge control unit SOC-CU.

Figure 4:
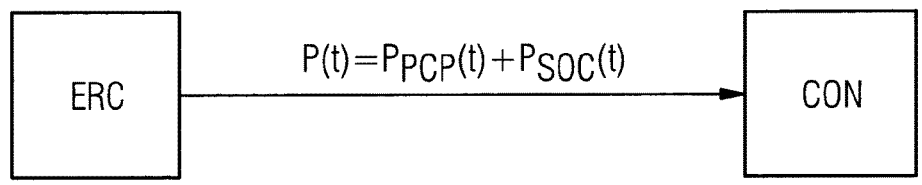
FIG. 4 shows a diagram for illustrating the control of a conversion device by an energy resource controller according to an aspect of the present invention.

As illustrated in FIGS. 1, 4, a power conversion device CON, i.e. the AC/DC converter, is controlled according to power control signals calculated by the state of charge control unit SOC-CU and the primary power control unit PPCU within the energy resource controller ERC. The power calculated by the state of charge control unit SOC-CU of the energy resource controller ERC is calculated depending on a current state of charge SOC of the energy storage device ESD and additional information data indicating an electricity price and/or a predicted demand for primary control power PCP by the power grid PG.

In a possible embodiment, the energy resource controller ERC is connected via the communication device COM to the central or distributed power grid control unit PGCU as illustrated in FIG. 1 and thus receives the information data indicating the electricity price and/or the predicted demand for primary control power PCP by the power grid PG. At least one grid parameter is used by the primary power control unit PPCU of the energy resource controller ERC and can be received from the local grid parameter measurement device M and/or via the communication device COM.

Figure 2:
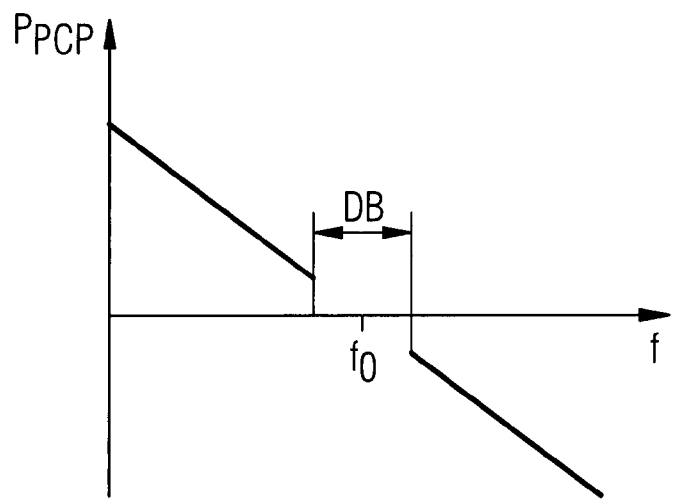
FIG. 2 shows a diagram for illustrating a possible implementation of a droop control as performed by a primary power control unit within an energy resource controller according to an aspect of the present invention.

In a possible embodiment, the primary power control unit PPCU is adapted to perform a droop control of the primary control power PCP depending on observed grid parameters of the power grid PG. In a possible implementation, the droop control is performed by the primary power control unit PPCU of the energy resource controller ERC depending on a grid frequency f of the power grid PG as illustrated in the diagram of FIG. 2. Depending on the frequency, the primary control power PCP is controlled by the primary power control unit PPCU of the energy resource controller ERC according to a response curve as shown in FIG. 2. At a low frequency f outside a dead band DB, a high primary control power is emitted by the AC/DC converter CON via the grid connection GC to the power grid PG to stabilize the frequency f of the power grid PG. At a high frequency f outside the dead band DB, power is absorbed by the AC/DC converter CON via the grid connection GC from the power grid PG and stored in the energy storage device ESD to stabilize the frequency f of the power grid PG. The power grid comprises a target frequency $f_0$, for instance 50 Hz. Within a dead band DB of e.g. 0.01 Hz around the target frequency $f_0$ asymmetrical response curves can be applied in a possible implementation to increase the operation lifetime of the energy storage device ESD. In a possible implementation, the primary power control unit PPCU has access to a memory, wherein several response curves for the dead band DB can be stored.

Figure 3:
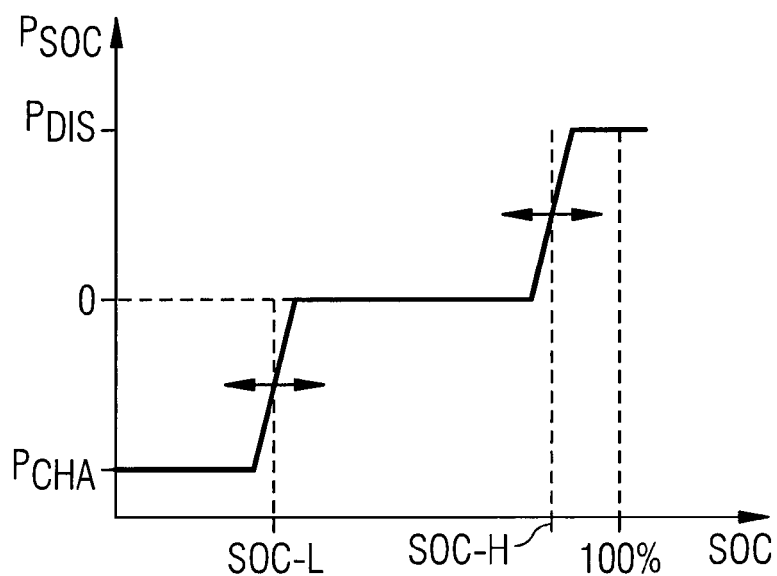
FIG. 3 shows a diagram for illustrating a possible implementation of a state of charge power control as performed by a state of charge control unit within an energy resource controller according to an aspect of the present invention.

The power control signals output by the state of charge control unit SOC-CU of the energy resource controller ERC are calculated depending on a current state of charge SOC of the energy storage device ESD and information data indicating an electricity price and/or a predicted demand for primary control power PCP by the power grid PG. The information data can be supplied to the energy resource controller ERC in real time or with a predetermined delay. The state of charge control unit SOC-CU of the energy resource controller ERC applies in a possible implementation a step-like SOC response curve to the AC/DC conversion device CON as illustrated in FIG. 3. In a possible embodiment, the SOC response curve comprises three ranges. In a low SOC range beneath the low SOC limit value SOC-L, the energy storage device ESD comprises a negative power emission and is charged via the AC/DC conversion device CON. In an intermediate SOC range between the low SOC limit SOC-L and the high SOC limit SOC-H, the energy storage device ESD comprises a neutral power emission and is neither charged nor discharged. Further, in a high SOC range, the energy storage device ESD comprises a positive power emission and is discharged.

Figure 5:
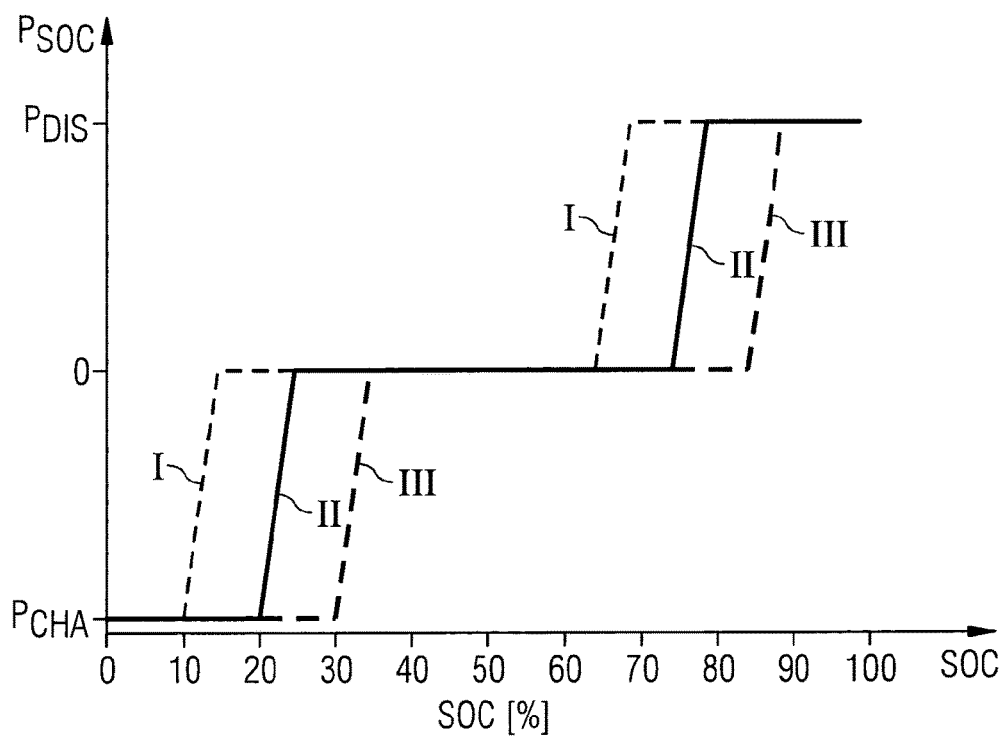
FIG. 5 shows a more detailed exemplary diagram for illustrating a possible implementation of a state of charge control by a state of charge control unit according to an aspect of the present invention.

FIG. 5 shows a specific implementation of such a step-like SOC response curve used by the state of charge control unit SOC-CU of the energy resource controller ERC. In a preferred embodiment, the limits between the SOC ranges of the step-like SOC response curve are adjustable. The limits between the SOC ranges of the step-like SOC response curve are adjusted depending on the information data indicating an electricity price and optionally also a predicted future demand for primary control power PCP by the power grid PG. Curve I shows the SOC response curve at a high electricity price, curve II shows the SOC response curve at a normal electricity price and curve III shows the SOC response curve at a low electricity price. The extent of the low SOC range of the step-like SOC response curve applied by the state of charge control unit SOC-CU is reduced and the extent of the high SOC range of the step-like SOC response curve applied by the SOC control unit is expanded, if the electricity price for electricity in the power grid PG is increased (curve I). When the electricity price in the power grid PG is increased, the SOC response curve is shifted to the left as illustrated in FIG. 5 (curve I). In contrast, if the electricity price in the power grid PG is diminished or reduced, the step-like SOC response curve illustrated in FIG. 5 is shifted to the right (curve III). In this way, if electricity price is reduced, the extent of the low SOC range of the step-like SOC response curve applied by the SOC control unit is expanded and the extent of the high SOC range of the step-like SOC response curve applied by the state of charge control unit SOC-CU is reduced. In the shown exemplary implementation of the SOC response curve used by the SOC control unit of the energy resource controller ERC, at an average normal electricity price (curve II) the lower SOC limit can be set at about 20% and the high SOC limit is at about 75% of the charging capacity of the energy storage device ESD. If the electricity price for electricity is high, the lower SOC limit SOC-L can be reduced to e.g. 10% and the high SOC limit SOC-H can be reduced to about 65% as illustrated in FIG. 5 (curve I), thus reducing the extent of the low SOC range and expanding the extent of the high SOC range so that power is preferably output and the battery is only loaded if its SOC is very low and loading of the battery becomes absolutely necessary despite the high electricity price. In contrast, if the electricity price in the power grid PG is low, the SOC limits can be pushed to the right. For instance, the low SOC limit can be shifted to about 30% and the high SOC limit SOC-H can be shifted to about 85% as illustrated in the diagram of FIG. 5 (curve III). In this way, the extent of the low SOC range where the battery is loaded, is expanded while the extent of the high SOC range where the battery is discharged, is reduced, if the electricity price in the power grid PG has a low level. The electricity price can be an intraday market price which the battery operator gets when discharging his battery or which the battery operator has to pay when loading his battery.

In a further possible embodiment the step-like SOC response curve can also be shifted depending on a predicted PCP demand. If the predicted future PCP demand is high the SOC response curve is shifted to the right (curve III) (so that electrical power is more readily input into the battery) whereas if the predicted future PCP demand is low the SOC response curve is shifted to the left (curve I) so that electrical power is more easily output by the battery. By this preemptive measure it can be prevented that the battery becomes later completely depleted or discharged by a future high PCP demand (prevented because its SOC curve was shifted beforehand to the right—curve III) or that the battery becomes later overloaded by a future low PCP demand (prevented because its SOC curve was shifted beforehand to the left—curve I).

In a possible embodiment of the system according to the present invention, the system comprises at least one energy storage device ESD formed by a battery having a predetermined storage capacity $C_{ap}$, a maximal power output $P_{DIS}$ at which it is discharged and a power input $P_{CHA}$ at which it is charged. The state of charge SOC of the battery is defined as the ratio of the current energy stored in the energy storage device ESD and the capacity of the energy storage device. Not taking into account power losses:

$$\frac{d}{dt}SOC(t) = 100 * \frac{-P(t)}{Cap},$$

wherein P(t) is the output power of the battery and SOC is indicated in percent of the energy capacity $C_{ap}$ of the battery.

To avoid that the battery is completely discharged or overloaded and consequently cannot fulfil the primary control power PCP requirements, the energy resource controller ERC according to the present invention comprises a state of charge control unit SOC-CU performing a state of charge control. The state of charge control indicates a power output of the battery as a function of the state of charge SOC and the electricity price in the power grid PG. Accordingly, $P_{Battery}$=f(SOC, price). In a possible embodiment also the predicted PCP demand can be taken into account: $P_{Battery}$=f(SOC, price, predicted pcp demand).

In a possible implementation, the stochastic demand for primary control power PCP by the power grid PG is indicated by information data received by the energy resource controller ERC via the communication device COM. In a possible implementation, this information data comprises an intraday market electricity price. The state of charge control performed by the state of charge control unit SOC-CU secures that the battery is charged with a power $P_{CHA}$, if the state of charge SOC of the battery is low. In the same manner, if the state of charge SOC of the battery is close to the capacity of the battery, the energy storage device ESD is discharged with a power $P_{DIS}$. In the intermediate SOC range as illustrated in the diagrams of FIGS. 3, 5, the battery is neither loaded nor does it output power. At each point in time, the battery provides the demanded primary control power PCP for stabilizing the power grid PG.

In a possible embodiment, the neutral intermediate range of the step-like SOC response curve is implemented as wide as possible to avoid an unnecessary active charging and discharging of the battery as far as possible so that costs are avoided and that the operation lifetime of the battery can be increased. The intermediate neutral range has to be sufficiently small such that a battery outside this range can be led back by the state of charge control into the neutral range in a reliable way without hurting the primary control power requirements of the power grid PG. This means that the energy storage device ESD is only actively charged or discharged when no primary control power PCP requirement of the network is affected. In a possible implementation, this can be achieved by a SOC response curve that can be shifted depending on the current electricity price.

In a possible implementation, the system shown in FIG. 1 can also comprise an additional power generator and/or a controllable load. In a possible embodiment, the system according to the first aspect of the present invention can be provided in a high-voltage transmission power grid. It is also possible to provide the system according to the present invention for local power grid networks. By the state of charge power control SOC-CU, the random walk effect caused by a stochastic demand for primary control power PCP in the power grid PG is suppressed so that electrochemical or electronic energy storage devices ESD can be used for storing the primary control power PCP. The specific form of the step-wise SOC response curve as illustrated in FIGS. 3, 5 can comprise a steep increase at a high state of charge SOC-H to a maximum power output $P_{DIS}$ and a steep decrease to a charging power input $P_{CHA}$ at low SOC so that the capacity limits of the battery are not reached. The wide neutral intermediate range guarantees that an unnecessary charging and discharging of electrical energy is avoided so that the operation lifetime of the battery is increased.

In a possible embodiment, the form of the SOC response curve as illustrated in FIGS. 3, 5, i.e. the SOC limits or the extent of the intermediate SOC range as well as the power input or output outside this range, can be calculated from historic data and battery dynamics by optimization methods and machine learning such that a predetermined target function can be maximized. This target function can comprise besides intraday current market prices the costs of local power generation and costs caused by aging of the energy storage device ESD. The target function or cost optimization function can be preconfigured and stored in the energy resource controller ERC. The energy resource controller ERC can comprise one or several microcontrollers to implement the primary control power unit PPCU and the state of charge control unit SOC-CU. Furthermore, the target function can be programmed and stored in the energy resource controller ERC to be used by the state of charge control unit SOC-CU. The configuration of the target function can be performed locally via a user interface of the energy resource controller ERC or remotely at the remote power grid control unit PGCU. The configured target function can be received by the energy resource controller ERC from the power grid control unit PGCU via the communication device COM.

The invention claimed is:

1. A system for providing a primary control power (PCP) for a power grid (PG) by an energy storage device (ESD), the system comprising:

an energy resource controller (ERC) connected to said ESD;
wherein said ERC has a state of charge control unit (SOC-CU) adapted to perform a state of charge (SOC) power control of said ESD to avoid inadmissible state of charge states of said ESD caused by a stochastic demand for said PCP by said PG;
wherein said SOC-CU of said ERC calculates power depending on a current SOC of said ESD and information data indicating at least one of an electricity price and a predicted demand for said PCP by said PG.

2. The system according to claim 1, wherein said ERC has a primary power control unit (PPCU) adapted to perform a primary power control of said ESD depending on at least one observed grid parameter of said PG.

3. The system according to claim 1, wherein a power conversion device (CON) connected between said PG and said ESD is controlled according to power control signals calculated by said SOC-CU and by a primary power control unit (PPCU) of said ERC.

4. The system according to claim 1, wherein said ERC is connected via a communication device (COM) to a central or distributed power grid control unit (PGCU) to receive the information data indicating the electricity price and predicted demand for said PCP by said PG.

5. The system according to claim 1, wherein the grid parameters used by a primary power control unit (PPCU) of the ERC are received from a local grid parameter measurement device (M) and/or via a communication device (COM).

6. The system according to claim 1, wherein a primary power control unit (PPCU) is adapted to perform a droop control of said PCP depending on an observed grid parameter of said PG.

7. The system according to claim 6, wherein the droop control is performed by said PPCU of said ERC depending on a grid frequency (f) of said PG.

8. The system according to claim 1, wherein the SOC-CU of the ERC applies a step-like state of charge response curve to said conversion device (CON) such that:
in a low SOC range the ESD comprises a negative power emission and is charged
in an intermediate SOC range the ESD comprises a neutral power emission and is neither charged nor discharged, and
in a high SOC range the ESD comprises a positive power emission and is discharged.

9. The system according to claim 8, wherein limits between the SOC ranges of the step-like SOC response curve are adjustable.

10. The system according to claim 9, wherein the limits between the SOC ranges of the step-like SOC response curve are adjusted depending on the information data indicating an electricity price and/or a predicted demand for the PCP by the PG.

11. The system according to claim 9, wherein the extent of the low SOC range of the step-like SOC response curve applied by the SOC-CU is reduced and the extent of the high SOC range of the step-like SOC response curve applied by the SOC-CU is expanded by said SOC-CU, if the electricity price is increased and/or the predicted demand for the PCP by the PG is reduced.

12. The system according to claim 9, wherein the extent of the low SOC range of the step-like SOC response curve applied by the SOC-CU is expanded and the extent of the high SOC range of the step-like SOC response curve applied by the SOC-CU is reduced by said SOC-CU, if the electricity price is reduced and/or a predicted demand for the PCP by the PG is increased.

13. A power grid comprising a plurality of ESDs, wherein at least a portion of the ESDs is equipped with the system according to claim 1.

14. An energy resource controller (ERC) for an energy storage device (ESD), said ERC comprising:
- a primary power control unit (PPCU) adapted to perform a primary power control of an energy storage device (ESD) depending on at least one observed grid parameter of a power grid (PG); and
- a state of charge control unit (SOC-CU) adapted to perform a state of charge (SOC) control of the ESD depending on received information data indicating an electricity price and/or a predicted demand for a primary control power (PCP) by a power grid (PG) to avoid inadmissible state of charge states of the ESD caused by a random walk effect evoked by a stochastic demand for the PCP in said PG;
- wherein said SOC-CU of said ERC calculates power depending on a current SOC of said ESD and information data indicating at least one of an electricity price and a predicted demand for said PCP by said PG.

15. A method for providing a primary control power (PCP) for a power grid (PG) by an energy storage device (ESD) connected to an energy resource controller (ERC) having a state of charge control unit (SOC-CU), the method comprising:
- performing, using the SOC-CU, a state of charge (SOC) control at the ESD to avoid inadmissible state of charge states of the ESD caused by a stochastic demand for primary control power (PCP) by said power grid (PG); and
- calculating, using the SOC-CU, power depending on a current SOC of said ESD and information data indicating at least one of an electricity price and a predicted demand for said PCP by said PG.

16. The method according to claim 15 comprising:
- controlling a power conversion device (CON) connected between PG and the ESD according to power control signals calculated by said SOC-CU and by said PPCU of said ERC.

17. The ERC according to claim 14, wherein the ERC is connected via a communication device (COM) to a central or distributed power grid control unit (PGCU) to receive the information data indicating the electricity price and predicted demand for said PCP by said PG.

* * * * *